(No Model.)
F. MAISCH.
GLOVE FASTENER.
No. 480,874. Patented Aug. 16, 1892.
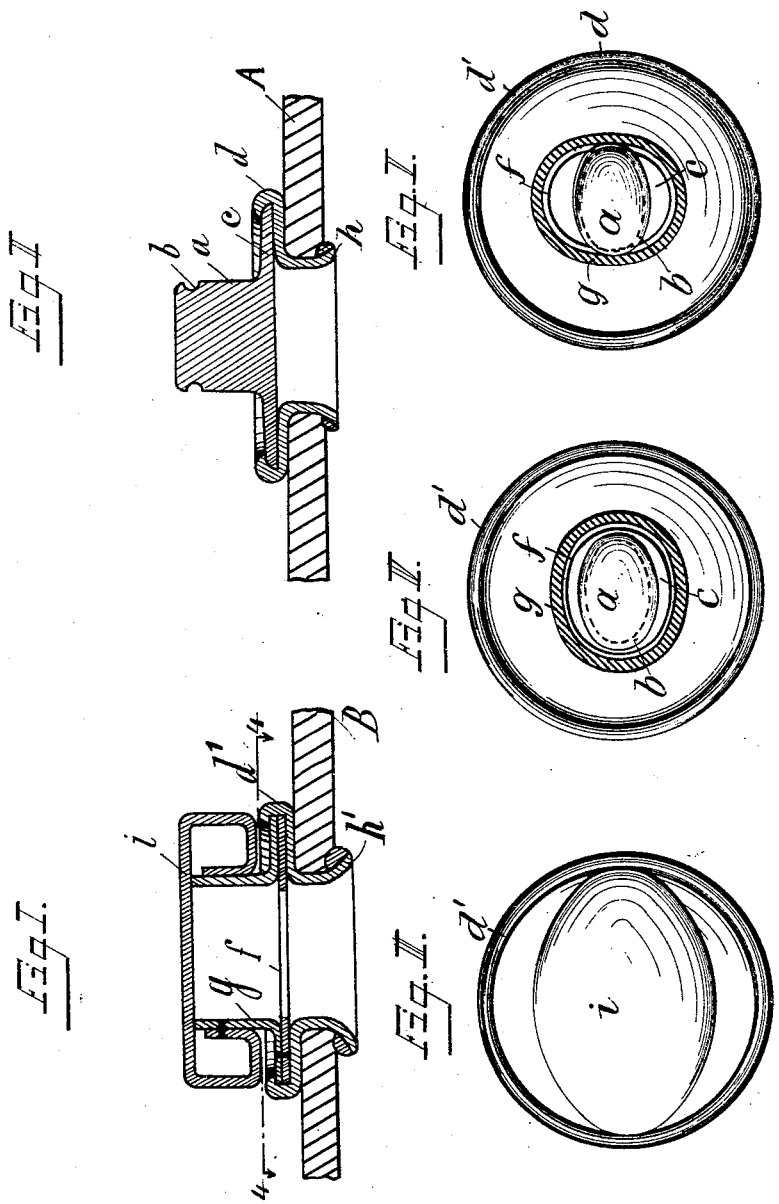
Witnesses:
Thomas M. Smith.
Richard C. Maxwell.
Inventor.
Friedrich Maisch,
By J. Walter Douglass.
Att'y.

UNITED STATES PATENT OFFICE.

FRIEDRICH MAISCH, OF NAPLES, ITALY.

GLOVE-FASTENER.

SPECIFICATION forming part of Letters Patent No. 480,874, dated August 16, 1892.

Application filed April 9, 1892. Serial No. 428,444. (No model.)

*To all whom it may concern:*

Be it known that I, FRIEDRICH MAISCH, a subject of the King of Prussia, residing at Naples, in the Kingdom of Italy, have invented a new and useful Glove-Fastener, of which the following is a specification.

My invention relates to fasteners for uniting or securing the overlapping edges of garments, as gloves, boots or shoes, and of traveling rugs, wraps, and the like.

The principal objects of my present invention are, first, to provide a neat, compact, attractive, durable, and comparatively inexpensive fastener for uniting or securing the overlapping edges of garments, wraps, and the like, and, second, to construct and arrange the respective parts of the fastener in such manner that the same are firmly held against accidental detachment and are nevertheless susceptible of being readily disconnected and coupled up or assembled whenever it becomes necessary or desirable so to do.

My invention consists of a fastener comprising a stud or pin, a locking-plate, and a revoluble cap connected with the locking-plate.

My invention further consists of a fastener comprising an oval or elliptical stud or pin provided with an annular groove, a revoluble cap adapted to be fitted onto said stud, and a locking-plate provided with an oval or elliptical slot for engaging and disengaging the groove in the pin or stud.

My invention further consists of the improved fastener hereinafter described and claimed.

The nature, scope, and characteristic features of my invention will be more fully understood from the following description, taken in connection with the accompanying drawings, forming part thereof, and in which—

Figure I is a transverse central section taken in the direction of the major axis of an oval or elliptical revoluble cap comprising one member of a fastener embodying features of my invention and showing a locking-plate provided with an elliptical or oval aperture and connected with the cap. Fig. II is a similar view taken in the direction of the minor axis of an oval or elliptical stud or pin comprising the other member of a fastener embodying features of my invention and showing an annular groove or recess for the reception of the locking-plate. Fig. III is a top or plan view of Fig. I. Fig. IV is a section on the line 4 4 of Fig. I, showing the stud or pin illustrated in Fig. II in position for engagement with the locking-plate—*i. e.*, in position for permitting of the attachment of the respective parts of the fastener; and Fig. V is a similar view showing the stud or pin in engagement with the locking-plate—*i. e.*, in position for securing or locking the respective parts of the fastener together.

Referring to the drawings, and more especially to Fig. II thereof, $a$ is an oblong or elliptical locking pin or stud provided with an expanded shank $c$ and an annular groove or recess $b$. This pin or stud $a$ is rigidly attached to one of the edges A of the article. In the present instance this result is accomplished by means of an eyelet $h$, that engages the portion A of the article in the usual manner, and is provided with a lip $d$, that clamps the shank $c$ of the stud or pin $a$ in such manner that the latter is firmly held to place.

In Fig. I, $i$ is an oblong or elliptical cap provided with a sleeve $g$, adapted for the reception of the stud $a$. $f$ is a locking-plate carried by the sleeve $g$ and provided with an oblong or elliptical aperture whose edges are adapted to engage the groove $b$ of the stud $a$, it being understood that the cap $i$, sleeve $g$, and locking-plate $f$ are all pinned, soldered, or otherwise connected together in such manner that they constitute in effect one piece. In the present instance the cap $i$ is connected with the other edge B of the article by means of an eyelet $h'$, adapted for the reception of the stud or pin $a$, and provided with a lip $d'$, that engages a circular flange on the sleeve $g$ in such manner that a seat is formed, in which the cap $i$ is afforded freedom of rotary motion.

In use the respective parts A and B of the article may be united or secured together by means of the hereinbefore-described fastener in the following manner: The part B of the article is caused to overlap the part A thereof, and the eyelet $h'$ is fitted over the stud $a$. The cap $i$ is then turned until the major axis of the aperture in the locking-plate $f$ and of the stud or pin $a$ coincide, as shown in Fig. IV, so that the edge of the aperture in the locking-plate $f$ is brought into alignment with the groove $b$. The cap $i$ is then turned until the major axis of the stud or pin coincides with the minor axis of the aperture in the plate $f$, as shown in Fig. V, and this movement of the cap $i$ causes the edge of the aperture in the plate $f$ to engage in the slot $b$ of the pin or stud, whereby the respective members of the fastener are secured against accidental detachment and the respective portions A and B of the article are held together.

In order to separate the respective members of the fastener and release the parts A and B of the article, the cap $i$ is turned into the position indicated in Fig. IV, whereupon the cap $i$ may be readily lifted off the stud or pin $a$.

It will be obvious to those skilled in the art to which my invention appertains that modifications may be made in details without departing from the spirit thereof. Hence I do not limit myself to the precise construction and arrangement of parts hereinbefore set forth and illustrated in the accompanying drawings; but,

Having thus described the nature and objects of my present invention, what I claim as new, and desire to secure by Letters Patent, is—

1. A fastener comprising an oval stud or pin adapted for attachment to one edge of an article, a revoluble cap adapted to cover said pin or stud and provided with a flange, a locking-plate rigidly secured to the cap, and an eyelet adapted for attachment to the other edge of the article and provided with a lip engaging said flange and constituting a seat for revolubly supporting said cap, substantially as and for the purposes set forth.

2. A fastener comprising an oval stud provided with a flange, an eyelet adapted for attachment to one edge of an article and provided with a lip clamping said flange, a revoluble cap adapted to cover said stud and provided with a flange, a locking-plate rigidly connected with said cap, and an eyelet adapted for attachment to the other edge of the article and provided with a lip engaging the flange of the cap to form a seat for revolubly supporting the latter, substantially as and for the purposes set forth.

In witness whereof I have hereunto set my hand in presence of two witnesses.

FRIEDRICH MAISCH.

Witnesses:
  HUB. HERMANN,
  OTTO LEUSENHAUSER.